Jan. 8, 1963     H. HOFSTETTER     3,071,918
APPARATUS FOR PROVIDING A CLEAR VIEW OF FAST MOVING ELEMENTS
Filed Feb. 9, 1960     6 Sheets-Sheet 1

Inventor:
HERMANN HOFSTETTER.
K.A. Mayr
Attorney.

Jan. 8, 1963 H. HOFSTETTER 3,071,918
APPARATUS FOR PROVIDING A CLEAR VIEW OF FAST MOVING ELEMENTS
Filed Feb. 9, 1960 6 Sheets-Sheet 3

Inventor:
HERMANN HOFSTETTER
K.A. Mayr
Attorney.

Jan. 8, 1963 H. HOFSTETTER 3,071,918
APPARATUS FOR PROVIDING A CLEAR VIEW OF FAST MOVING ELEMENTS
Filed Feb. 9, 1960 6 Sheets-Sheet 4

Inventor:
HERMANN HOFSTETTER
Attorney.

Jan. 8, 1963    H. HOFSTETTER    3,071,918
APPARATUS FOR PROVIDING A CLEAR VIEW OF FAST MOVING ELEMENTS
Filed Feb. 9, 1960    6 Sheets-Sheet 6

Inventor:
HERMANN HOFSTETTER
K. A. May
Attorney

United States Patent Office 3,071,918
Patented Jan. 8, 1963

3,071,918
APPARATUS FOR PROVIDING A CLEAR VIEW OF FAST MOVING ELEMENTS
Hermann Hofstetter, Zurich, Switzerland, assignor to Sulzer Freres, S.A., Winterthur, Switzerland, a corporation of Switzerland
Filed Feb. 9, 1960, Ser. No. 7,561
Claims priority, application Switzerland Feb. 10, 1959
6 Claims. (Cl. 57—56)

The present invention relates to an apparatus for producing a clear view of fast moving elements from which, due to the fast movement, particles are thrown off.

When working materials which move at a high speed, it is usually necessary that the operation is inspected, at least once in a while. For an efficient supervision it is essential that the view is absolutely clear and that there is nothing obstructing the view between the viewer and the part to be inspected. Most processes in which a material is worked or worked on are accompanied by development of dust; this is particularly the case when working textile materials or in comminuting processes. When machining material, sufficient amounts of coolant and/or lubricant must be supplied. These liquids are usually widely squirted about by the machine tools or the parts which are machined. This may also be the case in processes where a liquid must be atomized. In most processes it is necessary to observe the fast moving parts from which particles are thrown off or a material while it is comminuted or atomized so that necessary controls of the process can be applied.

It has been proposed to separate the space where the process takes place by means of transparent walls, for example sheets of plexiglass. In this way the operator is effectively protected from dust and liquid. The protective walls, however, are soon so covered with dust and liquid that there is no clear view of the parts which must be observed unless the operator continuously wipes the window panes.

If automatic window wipers are used, the panes must be rigidly supported. Window wipers have very little effect if the dust is fatty or consists of fibrous material, of if, in the case of liquids, the liquid contains fat or oil.

So-called clear screens are used on the bridges of naval vessels. These screens consist of fast rotating glass discs which throw off the water by centrifugal force and afford a reasonably clear view. For the purposes with which the present invention is concerned, these fast rotating discs are not suitable because they require very rigidly supported bearings and, for example, in rewinding machines, a great number of juxtaposed rotating discs must be provided which increase the possibility of accidents. Rotating glass discs are not suitable for machines in which yarn is worked whose fibers are fatty. These fibers would stick to the glass and, since they are very light, would not be thrown off.

It has been proposed to remove fibers and dust from fast moving threads in textile machines and, if desired, from adjacent surfaces of the machine frame by air or gas jets from nozzles which are mounted on a slide which is slowly moved along the machine. Instead of using nozzles or blast pipes, a fan may be mounted on the slide for producing an air current directed towards the threads or surfaces. Blowing away the dust in this manner does not produce the desired result. These blowing arrangements produce a clear view only where the slide is placed.

It has been proposed to arrange a filter along the entire length of textile machines for receiving the air which has been sucked away from moving threads by means of suction nozzles and returning the filtered air along the machine into the workroom. In these arrangements, the outlet velocity of the filtered air is maintained at 3 to 5 centimeters per minute so that no dust is stirred up. This low velocity, however, is insufficient to prevent spreading of dust which may be thrown off, for example, by fast rotating spools.

It is an object of the present invention to provide means for producing a clear view of fast moving elements from which, due to the fast movement, particles may be thrown, which method and apparatus avoid the disadvantages inherent in conventional methods and apparatuses. According to the invention, a layer of gaseous substance is produced to form a screen which is so shaped and moved at such a velocity that it cannot only be not penetrated by the thrown-off particles, but that it is also continuously renewed or cleaned.

Another object of the invention is the provision of an apparatus for producing a clear view of fast moving elements from which, due to the fast movement, particles are thrown off, which apparatus includes means for supplying a gaseous medium in such a way that a layer or screen is produced which not only moves at such a velocity that a curtain is formed which cannot be penetrated by the thrown-off particles, but which is also continuously renewed or cleaned.

Many processes, particularly in the textile industry, require maintenance of a uniform climate which depends on the materials which are worked. It is conventional to condition the air in the entire machine room according to the requirement whereby a compromise is made between the humidity of the air required for the process and economic considerations as well as the humidity which is comfortable for the operating personnel. With this conventional arrangement, all machines in the same room are subjected to the same climate. This has several disadvantages. The walls and ceiling of the room must be well insulated in order to prevent condensation. If several materials are simultaneously worked which require different humidities, the conventional air-conditioning plants cannot produce optimal conditions for the individual materials.

The invention provides screens which cannot be penetrated by the thrown-off particles and which, together with stationary parts of the machines, form enclosures around stations at which the textile materials are worked. Suitably conditioned air may be passed through these enclosures from an air-conditioning plant of which one may be associated with one or more textile machines. In this way, each individual machine is climatized and the conditioned air cannot move outside of the spaces enclosed by the air curtains. The arrangement according to the invention also provides unhindered access to the interior of the machines. Aside from the provision of a most favorable climate for the individual textile materials, the arrangement according to the invention permits individual measurement of the conditions within the individual machines or machine parts which measurements are needed for controlling the air-conditioning plant so that each individual conditioning plant can be controlled to produce best results. The room in which the machines are placed can be provided with an air-conditioning plant which operates solely for the comfort of the operators.

The air-conditioning plant and the means for producing an air screen may be served by separate air supply means whereby the air screens may form part of an air circuit which is not conditioned and which forms part of a conventional suction arrangement for removing broken threads. The pressure of the air in the circuit producing the air screen or air curtain and serving the suction plant for removing broken threads must be relatively high, for example 150 mm. water column, whereas the circuit for the conditioned air requires a pressure of only 20 to 30 mm. water column.

It may be of advantage to provide at the outside of the air screen a curtain made of translucent foil of synthetic material. The elevation in which this curtain is placed may be adjustable and the curtain may be composed of a plurality of narrow strips.

The novel features which are considered characteristic of the invention are set forth with particularity in the appended claims. The invention itself, however, and additional objects and advantages thereof will best be understood from the following description of embodiments thereof when read in connection with the accompanying drawing, in which:

FIGS. 15 to 17 diagrammatically illustrate a textile machine which is also air-conditioned and separated from the outside by air screens whereby the air screens are formed by air which is not conditioned and which is taken from an air circuit also serving devices for drawing in broken threads.

FIGURES 1 to 4 of the drawing diagrammatically illustrate a doubling frame 11 which has a plurality of like operating stations. Each station is provided with two or more spools 12 from which threads 13 run through an eye 14 into the nip of a pair of driven rollers 15. Thereupon, the threads 13 are twisted and pulled through a ring 16 and wound on a spool 17 which rotates at high speed. Depending on the quality of the yarn, particularly on the uniformity and length of the staples, more or less fibres and dust are separated from the threads 13 which move at great speed at the eyes 14 where the direction of movement of the threads is changed and at the rollers 15.

Figures 1, 2:
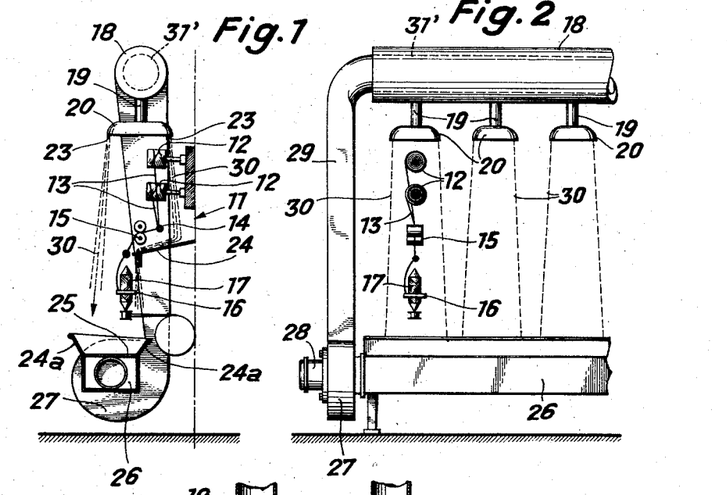
FIG. 1 is a diagrammatic cross sectional view of a doubling frame equipped with a clear view producing system according to the invention.
FIG. 2 is a portion of a side elevation of the doubling frame shown in FIG. 1.

Each station must be supervised, broken threads must be tied, empty spools 12 must be replaced by full spools and the full spools 17 must be replaced by empty tubes. The operator is exposed to the dust which not only fills the air around the machine but also settles on the operator.

Figure 3:
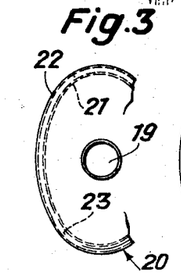
FIG. 3 is a top view of a portion of an outlet for the gas or air forming a screen in the machine shown in FIGS. 1 and 2.

Above each operating station an air duct 18 is provided longitudinally of the machine, an air outlet being connected to the duct 18 above each operating station. Each outlet includes a pipe 19 and a cap or bell-shaped outlet member 20 which covers an entire operating station. The cap 20 preferably has an elliptic shape as shown in FIG. 3 so that the spools 12 as well as the respective spool 17 and all intermediate parts are below a cap 20.

Figure 4:
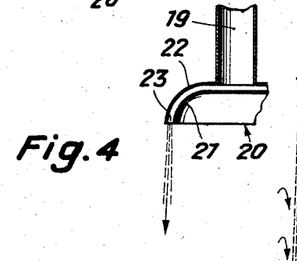
FIG. 4 is a vertical sectional view of the outlet shown in FIG. 3.

Each cap 20 includes an inner bell-shaped part 21 and a similarly shaped part 22 which is spaced from the part 21 and connected to the pipe 19 to receive air therefrom. The air passes between the two bell-shaped parts and leaves the space between the two parts through an elliptic slot 23 from where the air travels downward, forming an air curtain around the respective operating station. The velocity of the air leaving the slot 23 is such that it forms an air curtain at least at the elevation of the spools 12, at the eye 14 and at the rollers 15 which curtain forms a wall which cannot be penetrated by the dust and fibres thrown off at the aforesaid places. The dust and fibres are diverted by the air curtain to move along with the moving air. At the bottom of the machine diverging plates 24 are provided acting like a funnel for receiving the air and directing it into apertures 25 in the upper wall of an air duct 26.

The duct 26 is connected to the suction side of a blower 27 driven by a motor 28, which blower forces the air into a duct 29 and therefrom into the interior of a filter tube 31' arranged in the air supply duct 18. The filter 31' removes all dust and fibres from the air so that clean air passes through the pipes 19 and the outlet members 20. In order to relieve the fine filter 31', a coarse filter, not shown, may be provided at the outlet of the blower 27. Spreading and effect of the air leaving the slots 23 and forming air curtains 30 may be controlled by controlling the velocity of the air and/or by the configuration of the caps 20 and the slots 23 and their arrangement relative to the operating stations. If the outlet velocity is sufficient, dust and fibres will not penetrate the upper portion of the air curtain 30. Since the velocity of the air diminishes as it flows down, air from the lower part of the curtain 30 will eventually be blown onto the neighboring parts of the frame and other surfaces of the doubling frame 11 whereby dust settled on the surfaces is continuously removed and cannot be taken along by the fast moving threads.

Figure 5:
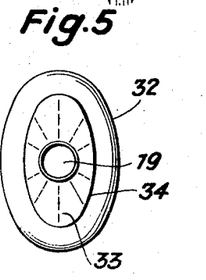
FIG. 5 is a top view of a modified outlet.
Figure 6:
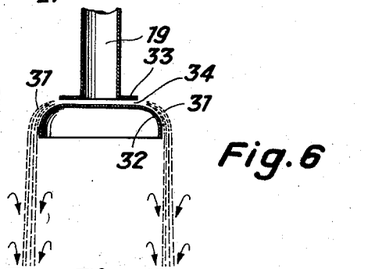
FIG. 6 is a vertical sectional view of the outlet shown in FIG. 5.

The cap 20 may be constructed as shown in FIGS. 5 and 6 whereby a bell-shaped part 32 of the same configuration as the part 21 in FIG. 4 is supported adjacent to the lower end of the tube 19. Instead of providing an outer bell-shaped part 22 as shown in FIG. 4, the lower end of the pipe 19 may be provided with a flange 33 which is spaced so far from the top of the part 32 that the flow area of an outlet slot 34 at the circumference of the flange 33 is smaller than the flow area of the pipe 19. By suitable choice of the pressure in the pipe 19 and of the outlet velocity of the air through the slot 34, the air is diverted along the downwardly curved rim portion of the part 32 by what is known as a "Coanda" effect. The radius of the curvature of the rim of the part 32 must have a certain minimum value. The air which is diverted downward over the entire circumference of the part 32 forms a laminated curtain 31 which dissolves rather quickly when moving through the surrounding air. This improves the effect of blowing air over the lower parts of the machine and will take place at a shorter distance from the part 32 than is the case with the structure shown in FIGS. 3 and 4.

The caps 20 or 32 may be articulated to the tubes 19, or the latter may be articulated to the duct 18 so that the direction and position of the air screens 30, 31 with respect to the spools 12, 17, the threads 13 and the driving apparatus 15 can be altered.

Figure 7:
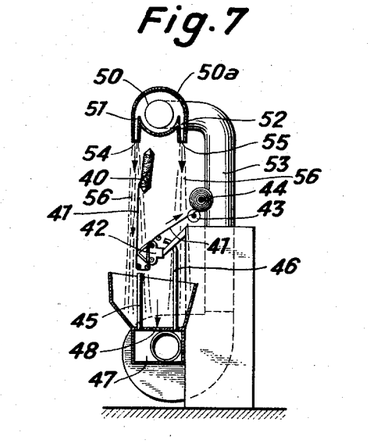
FIG. 7 is a diagrammatic cross sectional view of a rewinding machine equipped with an air screen according to the invention.
Figure 8:
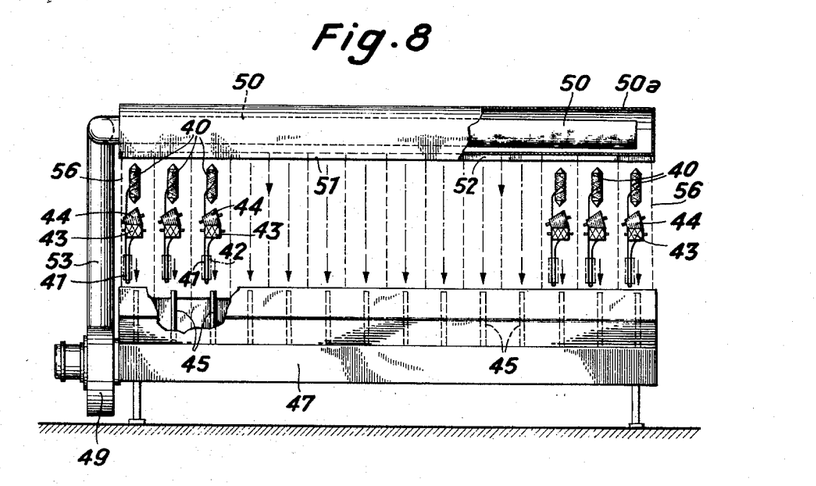
FIG. 8 is a side elevation of the rewinding machine shown in FIG. 7.

In the rewinding machine shown in FIGS. 7 and 8, cops 40 are placed on skewers and threads 41 are pulled off at the greatest possible speed by means of an apparatus 42 including a thread brake and a thread cleaner. The cleaned threads 41 are guided by winding drums 43 and wound on bobbins 44. The winding drums 43 are positively driven and drive the bobbins 44. Each apparatus 42 includes suction nozzles 45, 46 for drawing in and holding the ends of broken threads.

The air drawn in through the nozzles 45, 46 enters a duct 47 through apertures 48. A blower 49 transports the air from the duct 47 through a duct 53 to a fine filter 50 which extends all along the rewinding machine. Due to the large surface of the tubular filter 50, the outlet velocity of the filter is very low, for example 3 to 5 centimeters per minute. The tubular filter 50 is surrounded by a duct 50a provided with outlet nozzles 51 and 52. These nozzles extend over the whole length of the rewinding machine or at least as far as there are rewinding spools. The velocity of the air leaving the outlets 54, 55 of the nozzles 51, 52 is such that the air forms continuous moving layers 56 forming screens which cannot be penetrated by dust or fibres thrown off by the fast moving threads 41 and so that the screen is continuously renewed. When rewinding, the threads 41 move at a velocity of about 1000 meters per minute. Dust and fibres spread in horizontal direction because of the acceleration and the axial rotation of the unwound threads. As in the apparatus shown in FIGS. 1 and 2, the air forming the air screens in the apparatus shown in FIGS. 7 and 8 deflects the direction of movement of and takes the dust along so that a clear view of the individual winding devices is continuously obtained and the operator is not bothered by the dust.

The nozzle-shaped outlets 51 and 52 shown in FIG. 7 are tangentially connected to the duct 50a so that on either side of the spools 40 and of the brake and cleaning devices 42 an air curtain 56 is provided, the air curtains confining a space containing the parts of the machine from which dust and fibrous material may be thrown off. Since the outlets 51 and 52 extend over the whole length of the machine, a complete enclosure can be formed by extending the outlet slots 51, 52 beyond the outermost rewinding stations and by providing outlet slots at the ends of the duct 50a normal to and connecting the ends of the slots 51, 52 so that exit of dust and fibrous material at the ends of the machine is prevented.

The outlet slots 51, 52 may be subdivided into a plurality of individual slots so that individual air screens are provided on either side of each rewinding station. The outlet flow area of the slots 51, 52 may be made adjustable by changing the distance between the walls forming the outlets therebetween. The outlets 51, 52 may be articulated to the duct 50a so that they can be swung and the direction of the moving layers of air 56 relative to the moving threads can be changed.

Figure 9:
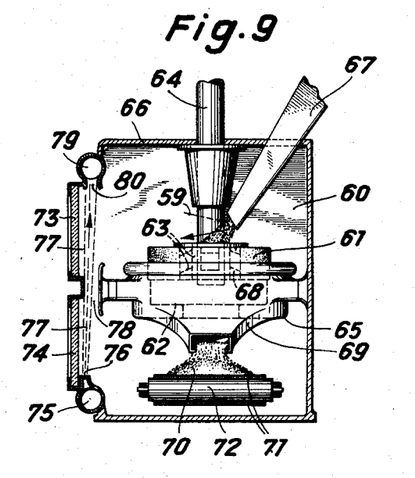
FIG. 9 is a diagrammatic upright part sectional view of a milling apparatus equipped according to the invention.
Figure 10:
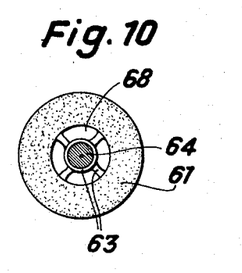
FIG. 10 is a diagrammatic plan view of a millistone forming part of the apparatus shown in FIG. 9.

FIGS. 9 and 10 illustrate the application of the invention to a grinding mill having an upper millstone 61 and a lower millstone 62. The upper millstone is annular and is connected by means of a sleeve 63 and ribs or spokes extending therefrom to a shaft 64 which is rotated as indicated by an arrow 59 by driving means, not shown. The lower millstone 62 rests on a support 65 forming a tub which is connected to a housing 66. The material to be ground is supplied through a shoot 67 and drops through the central opening 68 in the upper millstone 61 onto the lower millstone. The ground material leaves the millstones at the circumference thereof and enters the tub 65 which has an outlet 69. The material 70 leaving the outlet 69 spreads on a conveyor 71 which is supported by rolls 72.

The casing 66 forms a space 60 around the mill. Windows 73, 74 are provided in and dust-tight connected to the casing 66 for permitting supervision of the ground material as it is deposited on the conveyor 71. It is assumed that the mill is used for grinding a material which develops considerable dust and that the milling operation as well as the ground material must be inspected at least periodically. The dust developed by the milling process settles at the inside of the windows 73, 74, obscuring the view. According to the invention, a supply duct 75 for air or a gaseous medium is provided which duct has an outlet slot 76 so that the gas or air leaving the slot 76 forms a thin layer or curtain 77 across the width of the windows 73, 74.

The curtain 77 moves through a passage 78 formed by the wall of the housing 66 and protects the window 74 as well as the window 73. The top of the curtain 77 is received in an outlet duct 79 provided with an inlet slot 80 which is about as long as the windows 73, 74 are wide, The slot 80 is wider than the slot 76 because the thickness of the air curtain increases as it travels upward. The curtain or screen 77 is usually made of air. If the type of material to be milled does not permit the use of air, for example because it would be oxidized, or for other reasons, a neutral gas is used for producing the moving layer 77.

The thickness of the layer 77 and the velocity at which it moves must be so that the dust thrown towards the windows 73, 74 during the milling operation cannot penetrate the layer. The dust particles are diverted and taken along by the layer and removed through the duct 79. In this way, there is always a clear view of the mill and inspection of the milling operation is possible at any moment.

An advantage of the moving layer of air or gas 30, 31 (FIGS. 1 to 6) and 56 (FIGS. 7 and 8) is that the thrown off dust is not blown into the space surrounding the textile machine, as is done by conventional arrangements in which a fan is moved alongside the machine, but is taken along by the air screen and moved into a suction duct 26, 47, or 79 and does not settle within the spaces enclosed by the air screens. With the arrangement according to the invention, there is much less dust deposit on the surfaces of the textile machines than with conventional arrangements. The blowers 27 and 49 of the systems shown in FIGS. 1, 2 and 7, 8 may draw air from the work room so that the air screens 30, 31 and 56 terminate at the floor of the workroom.

The medium removed through the duct 79 in FIG. 9 may be filtered or otherwise cleaned and returned to the duct 75. This is of advantage if a relatively expensive gas must be used.

Figure 11:
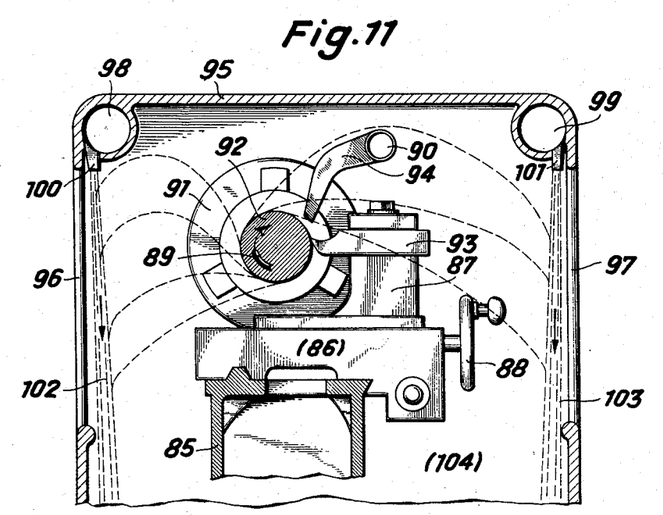
FIG. 11 is a diagrammatic cross sectional view of a high speed lathe equipped according to the invention.

FIG. 11 is a diagrammatic cross sectional view of a lathe having a longitudinal slide 86 and a cross slide 87, the position of which can be adjusted by a hand wheel 88. A work piece 92 is made fast on a chuck 91 and is worked on by means of a high speed tool 93 while it is rotated in the direction of the arrow 89. A coolant is introduced through a nozzle 94 connected to a supply pipe 90.

The amount of coolant must be increased at increased speed of rotation of the work piece. There is usually provided a shield 95 partly or entirely made of transparent material, Plexiglas, or the like, for catching the sprayed liquid. The shield prevents soiling of the surroundings and excessive losses of coolant or lubricant. Particularly if the latter is oil, the shield 95 loses its transparency if it is covered with the liquid on the inside. In machines of the kind shown in FIG. 11, the operation must be observed. For this purpose, openings 96 and 97 are provided in the shield 95. In order to prevent spraying of liquid through the openings 96 and 97, admission ducts 98 and 99 are provided which have outlets 100 and 101, respectively, extending over the whole length of the openings 96 and 97, respectively. Air is supplied through the ducts 98, 99 which leaves the outlets 100 and 101 at a suitable velocity to produce layers 102 and 103 flowing in downward direction.

The layers 102 and 103 completely close the openings 96 and 97. The velocity of downward movement of the air forming the layers 102 and 103 is so that the thrown-off droplets cannot penetrate the layers but are taken along by the layers and moved downward. If air is used for producing the layers or screens 102 and 103, no special means for receiving and carrying the air away are needed. The air flows into the lower part of the space 104 surrounded by the shield 95. The aforedescribed arrangement affords a clear view through the openings 96, 97 of the machine at any time.

Figure 12:
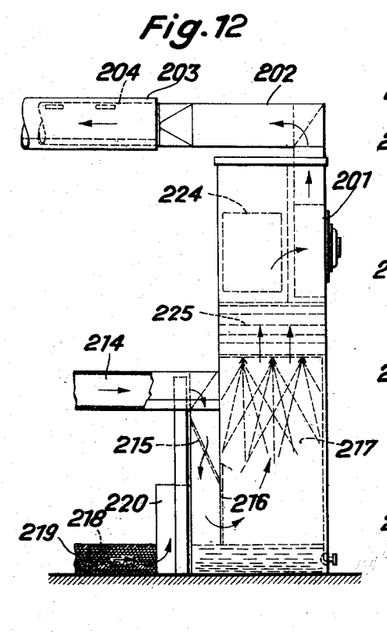
FIGS. 12 to 14 diagrammatically illustrate a textile machine which is air-conditioned and separated from the outside by air screens formed of conditioned air, FIG. 12 being a part sectional elevation of an end portion of the machine, FIG. 13 being a part sectional end view of the machine, and FIG. 14 being a diagrammatic sectional view made normal to the longitudinal axis of the machine.
Figure 13:
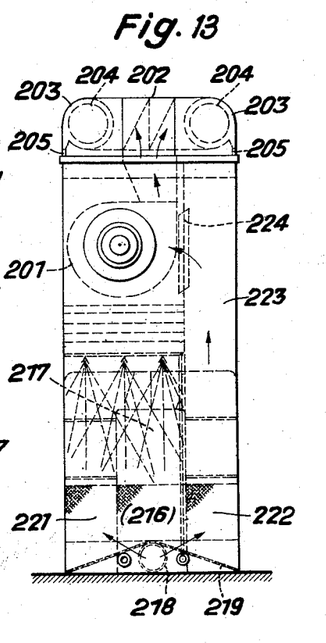
Figure 14:
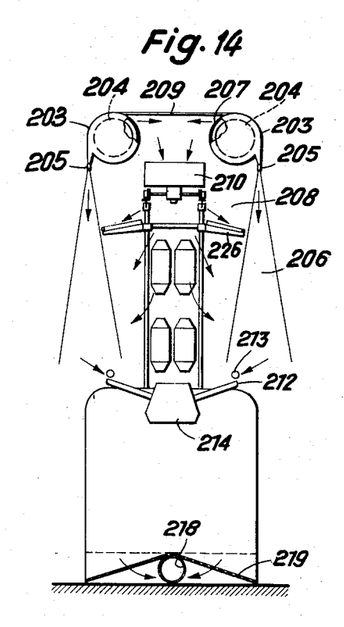
Figures 16, 17, 18:
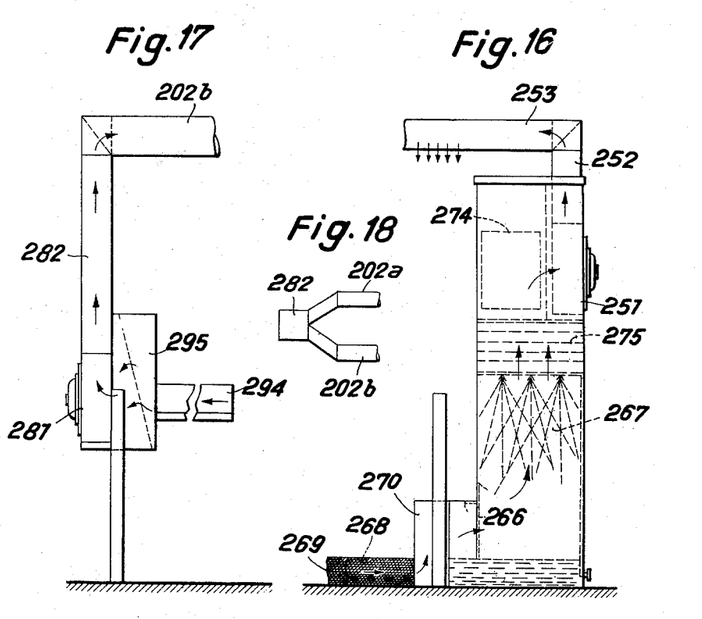
FIG. 16 is a longitudinal part sectional elevation of an end portion of the machine.
FIG. 17 is a diagrammatic elevation of the end portion of the machine which is opposite the end portion shown in FIG. 16.
FIG. 18 is a diagrammatic illustration of a detail of the machines shown in FIGS. 12 to 17.

In the textile machine diagrammatically shown in FIGS. 12 to 14, conditioned air is supplied by a fan 201 to a duct 202, which may be branched into two parallel ducts 202a and 202b as shown in FIG. 18, and is conducted into secondary filters 204. These filters, which may be of the type disclosed in the Swiss Patent No. 317,070, are individually surrounded by ducts 203 extending over the entire length of the machine and being provided with downwardly directed outlet nozzles 205 for forming air screens 206. Slots 207 extending over the entire length of the ducts 203 are provided in the upper quadrants of these ducts which are facing each other. Air which is conditioned particularly for the fibrous material worked in the machine is supplied through the slots 207 into the space 208 between the screens 206. The top of the space 208 is covered by sheet metal 209. A blower 210 mounted on a carriage which rolls on rails along the machine inside of the space 208 supplies air in the conventional manner for cleaning spools and other parts of the machine. This blower takes air from the space 208 which is initially supplied through the slots 207.

The conditioned air filling the space 208 and forming the screens 206 is returned to the suction side of the fan 201 in two different ways. Firstly, the fan 201 draws the air from the screens 206 and partly from the space 208 through nozzles 212 which form part of a suction device for drawing in broken threads and associated with a drafting arrangement 213 which is only very diagrammatically indicated. The air drawn through the nozzles 212 is discharged into a duct 214 from which the air flows through a preliminary filter 215 and through an opening 216 into a washing chamber 217 (FIGS. 12 and 13). Secondly, a uniform downward flow of conditioned air is maintained within the space 208 by means of the blower 210. The fan 201 draws the contaminated air from the space 208 through a preliminary filter 219 into a duct 218, placed on the floor and extending over the length of the machine. The air flows from the duct 218 through a distributor 220 (FIG. 12) and therefrom either through a port 221 into the washing chamber 217, or through a port 222 into a by-pass duct 223 (FIG. 13). A control flap 224 controls the connection between the by-pass duct 223 and the inlet of the fan 201 so that the humidity of the conditioned air can be regulated by directing a smaller or larger portion of the air taken from the bottom of the machine directly into the fan 201 and passing the balance of the air through the washing chamber 217. The temperature of the air flowing through the washing chamber and through the subsequent water separator 225 to the inlet of the fan 201 and thereby the humidity of the total conditioned air can be controlled by altering the temperature of the water sprayed into the washing chamber 217.

Shelves 226 are provided in the space 208 between the air screens 206 for supporting reserve spools so that also the material on these spools is exposed to conditioned air.

Figure 15:
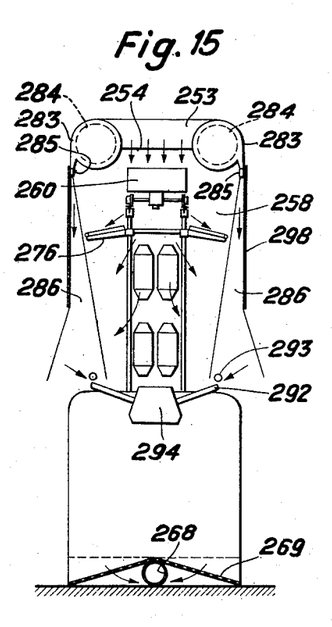
FIG. 15 is a diagrammatic cross sectional elevation of the machine.

In the arrangements shown in FIGS. 15 to 17, conditioned air is blown by a blower 251 through a duct 252 into a duct 253 which is placed at the top of the machine and extends over the entire length of the latter. The bottom 254 of the duct 253 is provided with perforations from which conditioned air flows into the space 258 (FIG. 15).

FIG. 15 shows a blower 260 which is mounted on a carriage and operates in the same manner as the blower 210 of the arrangement shown in FIGS. 12 to 14. The air in the space 258 is drawn from the bottom of said space through a suction duct 268 after passing a preliminary filter 269 and conducted to a distributor 270 (FIG. 16). Similar to the arrangement shown in FIGS. 12 to 14, the air either flows through an opening 266, a washing chamber 267, a dryer 275, or through a by-pass and a control flap 274 into the blower 251. The adjustment of constant climatic conditions is effected as in the example shown in FIGS. 12 to 14 by regulating the air flowing through the by-pass around the washing chamber and by regulating the temperature of the water supplied to the washing chamber. Shelves 276 for reserve spools are provided within the space 258 so that these spools are surrounded by conditioned air.

An air-conditioning plant common to several textile machines may be provided. If a separate air-conditioning plant is provided for each machine, this plant may be placed at one end of the machine and a plant for supplying air for serving a suction device for broken threads and serving the air screens may be placed at the other end of the machine. The latter plant includes a blower 281 (FIG. 17) which conducts air through a conduit 282 into two pipes 202a and 202b and therefrom into secondary filters 284 which are surrounded by ducts 283 (FIG. 15). The ducts 283 are provided with outlet nozzles 285 for producing air curtains 286 and do not have outlets, like the slots 207 in FIG. 14, for conditioned air.

After producing the air curtains 286, the air is drawn into suction nozzles 292 of devices for drawing in broken threads and associated with a drafting arrangement 293 and is conducted through a duct 294 and a preliminary filter 295 to the suction side of the blower 281.

The outsides of the air screens 236 may be defined by a transparent foil 298 made of synthetic material which foil may be subdivided into individual sections of a width between 4 inches and 20 inches along the machine and which may be adjustable as to its elevation.

Provision of such a foil is also of advantage in the arrangement according to FIGS. 12 to 14 because exchange between the room air and the conditioned air forming the air screens is impeded thereby.

I claim:

1. In a spinning machine in which a spinning material moves at great speed whereby particles separate from the material, an apparatus for producing a clear view of the moving spinning material, said apparatus including means for providing a continuous curtain of moving air around the moving material and confining a space coextensive with the entire machine and containing particles separating from the moving material, air conditioning means including means for controlling the humidity of the air, and means connected to said air conditioning means for conducting conditioned air from said conditioning means into said space.

2. In a spinning machine as defined in claim 1 and wherein said air conditioning means are also connected to said air curtain producing means for forming the air curtain of conditioned air.

3. In a spinning machine as defined in claim 1 and wherein said means for conducting conditioned air into said space includes a means placed on top of the spinning machine for directing conditioned air in downward direction onto the moving spinning material.

4. In a spinning machine in which a spinning material moves at great speed whereby particles separate from the material, an air circuit including means for sucking in broken threads and means for removing the broken threads from the air circulating in the circuit, said air circuit including air conditioning means including air humidity control means, means interposed in said circuit for producing a curtain of moving air from the air circulating in said circuit after removal of the broken threads and after control of the humidity of the circulating air, said curtain forming a closed space around the moving material and confining particles separating from the moving material within the space, and means interposed in said circuit for conducting conditioned air into said space.

5. In a spinning machine as defined in claim 4, a curtain made of transparent foil of synthetic material and placed on the outside of a portion of said air curtain which side is distant from the moving spinning material, and means for changing the position of said foil curtain to be alongside different portions of said air curtain.

6. In a spinning machine as defined in claim 5 and wherein said foil curtain is composed of a plurality of strips of a width between 4″ and 20″.

References Cited in the file of this patent

UNITED STATES PATENTS

| | | |
|---|---|---|
| 230,139 | Le Roy | July 20, 1880 |
| 2,320,964 | Yates | June 1, 1943 |
| 2,524,797 | Holtzclaw | Oct. 10, 1950 |
| 2,675,666 | Janner | Apr. 20, 1954 |
| 2,783,092 | Gavin et al. | Feb. 26, 1957 |
| 2,914,136 | Bahnson | Nov. 24, 1959 |

FOREIGN PATENTS

| | | |
|---|---|---|
| 732,972 | Great Britain | July 6, 1955 |
| 786,180 | Great Britain | Nov. 13, 1957 |